United States Patent [19]

Schaefer et al.

[11] 4,100,142

[45] Jul. 11, 1978

[54] POLYESTER PROCESS AND PRODUCT

[75] Inventors: Peter Schaefer, Charlotte; Peter Alan Mason, Salisbury; William Harold Yates, Charlotte, all of N.C.

[73] Assignee: Fiber Industries, Inc., Charlotte, N.C.

[21] Appl. No.: 734,214

[22] Filed: Oct. 20, 1976

Related U.S. Application Data

[62] Division of Ser. No. 288,837, Sep. 13, 1972, abandoned.

[51] Int. Cl.$^2$ .................. C08G 63/70; C08G 63/12
[52] U.S. Cl. ................................. 526/68; 264/211; 526/65; 528/272; 528/481
[58] Field of Search ..................................... 260/75 M

[56] References Cited

U.S. PATENT DOCUMENTS

| | | | |
|---|---|---|---|
| 3,185,669 | 5/1965 | McKinney | 260/75 M |
| 3,431,243 | 4/1969 | Uno et al. | 260/75 M |
| 3,438,942 | 4/1969 | Scheller | 260/75 M |
| 3,446,772 | 5/1969 | Förster et al. | 260/75 M |

*Primary Examiner*—Lucille M. Phynes
*Attorney, Agent, or Firm*—Robert J. Blanke

[57] ABSTRACT

A continuous process for producing high molecular weight polyester of fiber-forming quality is described. The process includes the direct esterification of a dicarboxylic acid with a glycol to yield a prepolymer mixture of ester and low molecular weight polyester condensable under conditions of elevated temperature and vacuum into polymer of high intrinsic viscosity.

11 Claims, 1 Drawing Figure

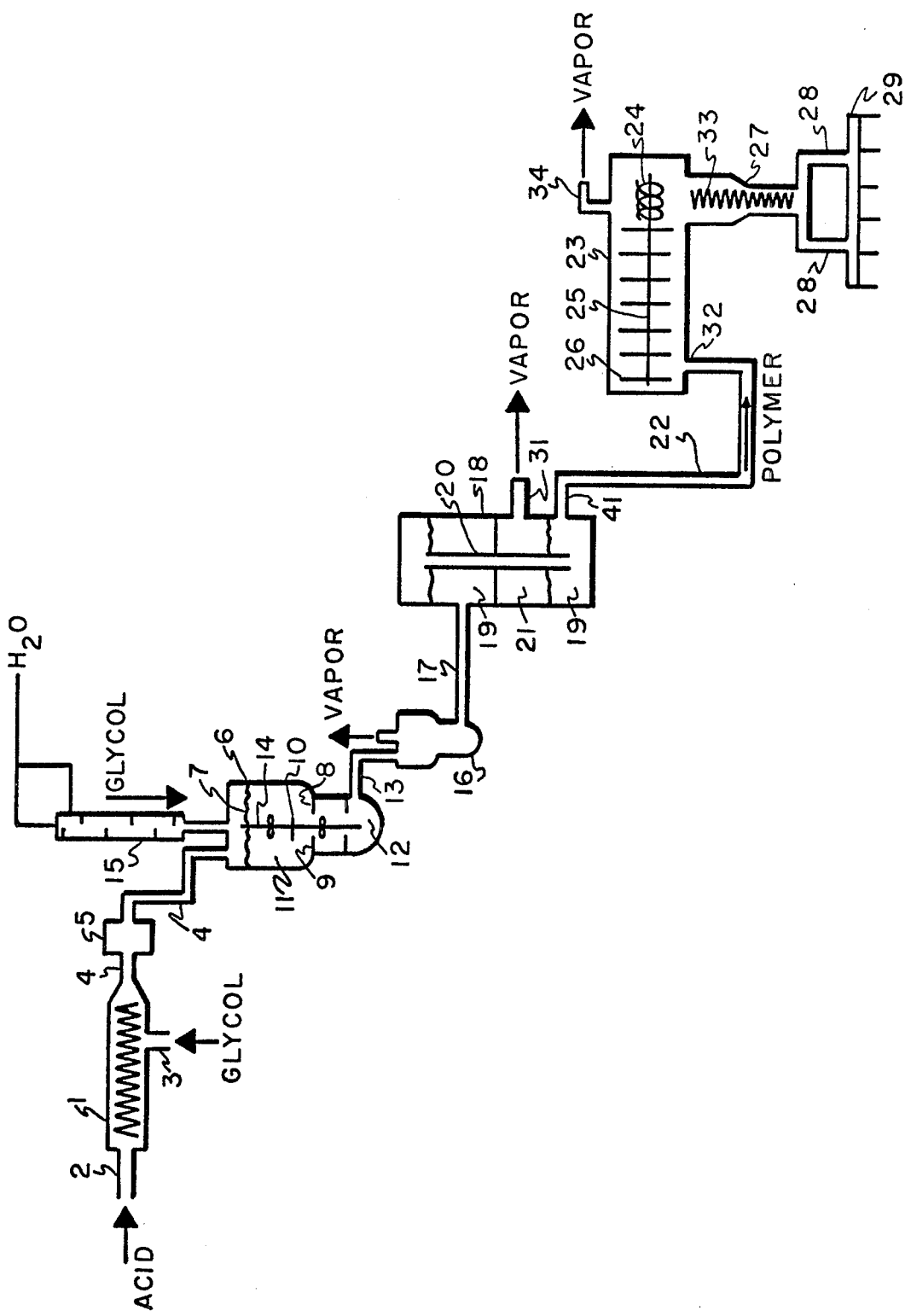

POLYESTER PROCESS AND PRODUCT

CROSS-REFERENCES TO RELATED APPLICATIONS

This is a divisional of the now abandoned application Ser. No. 288,837, filed Sept. 13, 1972.

BACKGROUND OF THE INVENTION

This invention relates to a novel process for producing polyesters. More particularly, this invention relates to a continuous, integrated, multistep process for producing high molecular weight polyester involving the direct esterification of a dicarboxylic acid with a dihydric alcohol to form a monomeric product to be susequently polymerized in a minimum of stages to polyesters characterized by uniformity and intrinsic viscosities heretofore unobtainable.

Film and fiber-forming linear polyesters are generally prepared by initially converting the free dicarboxylic acid or acid-forming derivative thereof to the dialkyl ester which is then reacted with the desired dihydric alcohol or glycol under the influence of a transesterification catalyst to form the glycol ester or monomer. This ester product is polycondensed in the presence of a suitable catalyst, splitting out excess diol, under reduced pressure and elevated temperatures to form high molecular weight polyesters suitable for conversion into molded and extruded articles. The polymerization or polycondensation phase of the overall process is usually conducted in a plurality of reaction vessels, each succeeding vessel operating under lower pressure and higher temperature than the preceeding one until desired or maximum product intrinsic viscosity is reached. In accordance with certain prior art teachings, the polycondensation reaction may be subdivided into "low," i.e. product attains an intrinsic viscosity up to about 0.1 to 0.4, preferably about 0.25 and "high" polymerization stages, each stage, and particularly the latter, requiring more than one independent reactor.

When the ester interchange process is employed, that is, the monomer is formed by the transesterification reaction hereinbefore described, certain process disadvantages are present which, in turn, limit the usefulness of the product resulting therefrom. Obviously, the first disadvantage exists at the beginning of the process since an intermediate product, the dialkyl ester, must be produced prior to formation of glycol ester monomer. Aside from the pure economic deficiencies of such a process, catalytic and alcoholic impurities are readily introduced into the system which propagate side reactions during polycondensation and limit the length of the polymeric chain obtained. The latter result is particularly detrimental in terms of final product properties since a polymeric ester of longer average chain length of repeating monomeric ester units will have a higher molecular weight corresponding to increased intrinsic viscosity. Naturally, high intrinsic viscosities are desired, especially where products such as continuous filaments suitable for tire reinforcement are contemplated, due to the higher tenacities possible in conversion articles. With employment of the transesterification process, intrinsic viscosities as high as 1.0 are rarely obtainable, the intrinsic viscosity generally residing in the range of about 0.4 to 0.9.

If a single factor were to be indicated as primarily accounting for the deficiencies associated with the transesterification process, it would be the presence during polycondensation of alkyl alcohol, particularly methanol as in the case of dimethyl terephthalate intermediate, which functions as a "chain stopper", thus effectively limiting molecular weight and intrinsic viscosity. The ester interchange reactionm as with virtually all chemical reactions under defined conditions, reaches an equilibrium point involving oppositely competing reactions as opposed to proceeding to 100 percent transesterification. Adjustment of reaction conditions to drive the reaction to as near 100 percent completion as possible, involving the employment of complicated equipment and impractical process parameters, can be attempted. It is only under extreme conditions, however, that the reaction approaches the percent ester interchange required, i.e. about 99.8 percent in the case of ethylene terephthalate monomer prepared by reacting dimethyl terephthalate and ethylene glycol, for the production of high molecular weight polymers, i.e. intrinsic viscosities of about 0.8.

Recently, it has been proposed to eliminate the above problems associated with the ester interchange process by directly esterifying dicarboxylic acid with desired dihydric alcohol, i,e, direct esterification of terephthalic acid with ethylene glycol in the case of polyethylene terephthalate, prior to polymerization. In large part, the direct esterification route became a commercial possibility through the development of terephthalic acid of relatively high purity. Depending upon contaminants present, terephthalic acid of about 90 to 100 percent purity will not significantly affect final product properties, particularly melting point and polymer color.

This path to high molecular weight polyester production incorporates obvious economic benefits into the overall process while enabling the production of a product of higher intrinsic viscosity with the resulting enhancement of converted article properties. For example, the direct esterification method does not entail the use of the transesterification catalysts, well-know color formers and insolubles removed with difficulty, during monomer formation nor does it requires a high percent ester conversion. In fact, since chain stoppers are not inherently present or generated during monomer production, a relatively low percent completion of the direct ester-forming reaction, i.e. about 50 to 75 percent where desired, still enables the theoretical preparation of polyesters of high purity and intrinsic viscosity, i.e. intrinsic viscosities within the range of about 1.0–1.5 and higher where desired. Of course, products of lower intrinsic viscosity can be produced, i.e., 0.4–0.6, but it should be realized that the benefits of the direct esterification path are more apparent with respect to higher molecular weight polyester.

However, the theoretical ability to attain a high molecular weight product is not in itself determinative of the ability to produce polyester product of fiber and film-forming quality or polyester suitable for use in other extrusion and molding applications. In order to achieve the ultimate objections of high quality and reproducibility coupled with high intrinsic viscosity, side reactions, particularly ether formation, must also be minimized. Although the polymeric ester may still be of high molecular weight, the presence of minor amounts of impurities can significantly lower polymer melting point, a relatively high melting point, i.e. about 258° C, being an important characteristic for high temperature processing.

In direct esterification, unforeseen problems can develop which are not present in the ester interchange process during the polymerization stages because of the high intrinsic viscosities generated which may be above 1 to 1.5. Paramount among such problems is the thermal sensitivity of the polycondensed product. As vacuum is increased and temperature raised during the final stages of polymerization, polymer degradation can eliminate the advantages gained through employment of the direct esterification method. Often, temperature is increased to within a few degrees of the degradation temperature ranges of the polymer. Hence, maximum molecular weight development requires extremely accurate control of the temperature of the molten mass under existing process conditions. At this point in the process, another factor not found with the ester interchange process cooperates with temperature to accentuate the thermal problem. This factor is end product viscosity. With intrinsic viscosities as aforementioned, melt viscosities as measured at polymerization temperature may range as high as 10,000 to 100,000 poises and are rarely below 2,000 poises. The power required within the reaction vessel to agitate this extremely viscous polymeric mass can in itself offset the delicate balance between heat input and degradation. Thus, direct esterification requires precise control of process parameters and reaction equipment design not contemplated nor required by prior processes. Further, high molecular weight must be developed without undue residence time. A long residence time at high temperatures again causes polymer degradation resulting in a darkly discolored and non-uniform product. However, it would be expected that direct esterification, of necessity, would involve long residence times, and, that this would be another factor which must be overcome before commercially acceptable product suitable for the desired end uses can be prepared.

It is an object of the present invention to provide a continuous, integrated process to produce polyesters of high intrinsic viscosity and of suitable properties for conversion into shaped articles, particularly fibers and films. It is another object of this invention to provide a continuous process to produce high molecular weight polyesters wherein monomer for polycondensation is prepared by direct esterification of a dicarboxylic acid with a glycol.

Still another object of the present invention is to provide a reproducible process to produce polyethylene terephthalate of fiber and film-forming quality having intrinsic viscosities heretofore unobtainable.

A further object of this invention is to provide a method for producing polyesters of high intrinsic viscosity involving direct esterification and polycondensation stages wherein side reactions are minimized and means are provided to enable the attainment of high molecular weights within reasonable residence times and under conditions preventing product degradation.

Other objects of the invention will appear obvious from the detailed description of the invention hereinafter.

SUMMARY OF THE INVENTION

It has now been found that polyesters of fiber-forming quality may be prepared in a continuous manner by a process comprising directly esterifying a dicarboxylic acid with a glycol at a pressure above the partial vapor pressure of said glycol at the temperature of reaction, said temperature being sufficient to allow the continuous removal of water of esterification in the vapor phase, continuing said esterification for a time sufficient to form an oligomer mixture comprising ester and a mixture of low molecular weight polyester characterized by at least a 50 percent, preferably 90 to 95 percent, esterification based on carbonyl groups initially present, while continuously returning evolved glycol to said system; subjecting said oligomer mixture to a lower pressure as low as about atmospheric pressure at a temperature sufficient to continue the evolution of water of esterification and glycol while increasing the percent esterification up to about at least 95 percent and further condensing and esterifying said oligomer mixture under conditions of vacuum and elevated temperature while continuously removing evolved water and glycol to form a fiber-formable polyester.

Following multistage esterification, high molecular weight may be developed by passage of the oligomer mixture through a plurality of zones of increasing vacuum and temperature terminating, for example, with a polymer finisher operating under a vacuum of about 0.1 to 10 mm. Hg at a temperature of about 270° to 310° centigrade.

In a preferred embodiment of the invention, as described in greater detail hereinafter, a pumpable paste is formed of the dicarboxylic acid and glycol within the molar ratio of glycol/diacid of about 1.2/1 to 1.8/1, utilizing terephthalic acid of predetermined particles size range and distribution, for metering into the first stage of esterification operating at a temperature within the range of about 197° to 300° centigrade, preferably 225° to 275° centigrade, most preferably about 250° centigrade, under autogenic pressure of about 5 to 600 p.s.i.g., preferably about 20 to 40 p.s.i.g., most preferably about 40 p.s.i.g., to form a product of defined characteristics to be subsequently subjected to further conditions of esterification at a pressure below that employed in the first stage, that is, a pressure within the range up to about 600 p.s.i.g., preferably below 80 p.s.i.g. and most preferably about atmospheric pressure, with a temperature in the range of about 197° to 300° centigrade, to increase the degree of esterification to approximately 100 percent based on carboxylic groups initially present prior to high molecular weight development. The primary esterifier, as well as the secondary esterifier where desired, is designed to afford a high degree of backmixing throughout the vessel to produce intermediate product of lowest relative diethylene glycol and free carboxyl group content. Similarly, it has been found that by regulation of flow path and residence time through a high polymerizer or finisher of the type generating molten films of polymer by means of rotating foraminous members a final product is produced spinnable into continuous filaments of optimum molecular weight distribution for use as reinforcement materials.

DETAILED DESCRIPTION OF THE INVENTION

Reference is made to the drawing wherein one embodiment of the invention is depicted. The drawing exemplifies the present invention in showing a schematic representation of a continuous process for producing polyester by the direct esterification method. The drawing is described with reference to the production of polyethylene terephthalate, it being understood, of course, that other dicarboxylic acid-diol reactants are contemplated as discussed in greater detail hereinafter.

Dicarboxylic acid and glycol reactants are continuously metered into a mixer 1 through its inlets 2 and 3, respectively. The glycol is added downstream from the particulate acid, as in the case of terephthalic acid and ethylene glycol, to avoid formation of large agglomerates which may clog the discharge line and slow the esterification reaction, thus interrupting the continuous process. The mixer 1 may be of any suitable type capable of forming a pumpable paste of diacid-glycol. For purposes of illustration, a longitudinally oriented vessel which may, for example, be of a vaned agitator or flighted screw type is shown. The paste, due to its high viscosity is positively conveyed by a pump 5 through a conduit 4 into a primary esterifier 6 above a liquid level 7. Considering the primary esterifier in greater detail, there is seen a semi-compartmentalized reactor with baffle means 8, 9 and 10 forming upper and lower reaction zones 11 and 12. Monomer is continuously withdrawn through a line 13. An agitator 14 functions to rapidly dissolve incoming paste in liquid monomer as well as aiding the esterification reaction by physically causing molecular interaction and adequate heat transfer. Although the primary esterifier need not be compartmentalized, it preferably contains 2 or more semi-compartments, i.e. 2–6 compartments, separated by suitable baffles to prevent excessive passage of undissolved, particulate dicarboxylic acid either into the polymerization stage of the integrated process or where employed, into the secondary esterifier. The semicompartmental design is preferred in certain embodiments of the invention because of certain advantageous results accruing from the flow pattern formed thereby as described in greater detail hereinafter. The primary esterifier is operated above the partial vapor pressure (the pressure generated by the quantity of glycol in the primary esterification system) of the glycol at the temperature employed to insure maximum retention of glycol in the system for esterification while allowing maximum removal of water, i.e. the pressure should be regulated so that it does not exceed about the sum of the partial vapor pressures of water and glycol within the system, i.e. less than about autogenic pressure. Of course, applied pressures are applicable where desired as long as other process parameters can be adjusted to achieve the desired result, that is, water removal and glycol retention. Autogenously generated steam is sufficient to maintain the desired pressure range within the reactor. Water is removed through a distillation column 15 wherein glycol is condensed and washed as it flows back into the esterifier. Thus, the primary esterification process step, which can be a multi-step design, is essentially self-compensating with respect to glycol. If this were not so, a large molar excess of glycol would have to be supplied to the reactor to reach an acceptable degree of esterification. For practical purposes it is nearly impossible to achieve over 95 percent esterification, that is, to esterify over 95 percent of carboxylic groups initially present, under pressures as described, because of retention of water within the system. It has been found highly desirable to insure that an essentially 100 percent dicarboxylic-reacted effluent, corresponding to at least 50 percent esterification, is fed into the polycondensation stage. Product and process advantages, particularly with respect to low ether formation, rapid molecular weight development and polymer product uniformity are evident where an effluent free of unreacted diacid is produced at this stage of the overall process. To this end, intermediate from the primary esterifier is passed to a secondary esterifier 16 operating under a lower pressure than the first esterifier. As a result, process monitoring benefits due to a gradual decrease in pressure are realized. Temperature in vessel 16 may be maintained at about that employed in the primary esterifier since the paramount purpose of the second stage is the maximum removal of water and excess glycol leading to a further increase in percent esterification. As discussed hereinbefore, with the direct esterification process, about a 50 percent esterification is sufficient for production of fiber-forming material of high intrinsic viscosity since chain stoppers are not inherently present in the first product of esterification. In such instance the effluent may be transferred directly to a polymerizer. The second esterifier where in use is indicated generally at 16 since the design thereof can correspond, for example, to that of the primary esterifier. The liquid inlet is positioned above, although it may be below, the liquid level in the reactor. Agitation is not required since the lower relative pressure therein causing vapor emanation, especially of glycol, creates sufficient agitation within the liquid. Since the objective is to complete the esterification step therein, excess glycol as well as water is desirably removed from the reactor; hence, the distillation column is eliminated, and vaporous effluent can be separated by suitable distillation into a water fraction which is passed to sewage and a glycol fraction to be recycled by means of a glycol recovery system not shown to the mixer 1.

Product of esterification, as more fully defined hereinafter, is then fed to the polycondensation phase of the continuous process wherein a single polymerizer may be employed or, as presently recommended and preferred, a multistage "low" or first polymerizer and a single stage "high" or final polymerizer are sequentially employed. A "low" polymerizer 18 can be constructed of a plurality of chambers 19 connected by means of a plurality of conduits 20 positioned with inlets slightly above the liquid level in the upper or first compartment (i.e. a series of separate vessels with appropriate tubing could be employed) and outlets dipping below the liquid level of the next compartment, i.e. if a third compartment is desired a second series of transfer tubes would arise from below the liquid level of the third compartment up into a vapor space 21, being positioned comparably to the upper series of transfer tubes 20. In the preferred embodiments of the invention two to three reaction zones or stages are employed in the low polymerization system with temperature being increased step-wise in each reaction zone from inlet to outlet while pressure is being reduced, that is, vacuum is progressively increased in stages from feed inlet to low polymerizer product outlet. This pressure drop, assisted by the turbulence of the system where present during the initial stages of polymerization under subatmospheric pressure, causes liquid as well as evolved vapors consisting primarily of water-glycol mixture, to flow from an upper or previous zone to the next succeeding zone of lower pressure. Since the outlets of the transfer tubes dip well below the surface level of liquid, material from the previous zone passes substantially through the entire liquid level before flowing to the final outlet or a succeeding reaction zone. The vaporous effluent is removed from the final reaction zone. If this procedure was not maintained, low molecular weight oligomer could be lost as part of discarded vaporous effluent due to the entrainment thereof in the "flashing" glycol-water mixture at subatmospheric pressure. Stabilization of oligomer occurs through redissolution of vapor in a subsequent reaction zone wherein the oligomer attains a molecular weight sufficiently high to virtually eliminate sublimination and/or entrainment of product under existing temperature and vacuum conditions. The product of "low" polymerization exits as overflow by means of gravity through an outlet 41. Liquid level may be regulated by location of the overflow. Rate and degree of polymerization in the low polymerizer may be maintained constant as desired by proper regulation of inventory and feed rate, and temperature and pressure differentials throughout the system, to allow sufficient residence time for production of low molecular weight polymer of desired characteristics within the liquid fraction of the system. The product of the low polymerizer is transferred to a second polymerizer 23 through a conduit 22. In the illustrative embodiment, a single "high" polymerizer is depicted, one of the process advantages of this invention being the use of a single vessel in which the intermediate as more fully defined hereinafter from the "low" polymerizer, i.e. one having an intrinsic viscosity of about 0.2, is converted into high molecular weight, fiber-forming product. The "high" polymerizer is preferably a cylinder-shaped vessel, longitudinally aligned with inlet 32 in one end and a rotatable shaft 25, coinciding with the longitudinal axis, carrying a plurality of formaminous members 26 and, adjacent gravity-feed product discharge 33, a forwarding spiral 24. Evolved glycol from polycondensation exits through an outlet 34 in the top of the reactor. A funnel-shaped screw extractor 27 forces the viscous product through dual, symmetrically-arranged outlets 28 into a spinning manifold 29. Temperature is increased in the "high" polymerizer, accompanied by a further reduction in pressure by means not shown. As the temperature of the molten mass approaches the polymer degradation temperature, accurate temperature control both within the polymerizer and extractor is required. Further, residence time is controlled to be as short as practical, since polymer degradation is a function of time versus temperature, but commensurate with production of high molecular weight product. The rotating formaminous members, with increasing mesh sizes, i.e. percent void space, and progressively longer distances between consecutive formaminous members from inlet to outlet form thin polymeric films creating a large surface area for glycol evaporation in an upper vapor space, the reactor being only partially, i.e. 1/10 – 1/5, full.

The foraminous members which may be in the form of screens, perforated discs, spoked wheels and the like, are of such diameter, typically slightly less than the internal diameter of the cylinder, to expose maximum polymer surface area to the upper vapor space, thus facilitating removal of volatiles and further condensation into high molecular weight product. Members 26 are spaced to eliminate significant bypassing passing and bridging thereinbetween with percent void space, and the positioning thereof, increasing sufficiently to allow an uninterrupted flow of polymer toward discharge.

Critical features of a typical "high" polymerizer, resulting in a preferred flow pattern leading to a polymer extrudable into continuous filaments of desired molecular weight distribution are described more fully hereinafter. Likewise, the individual process steps of the above described continuous process will be considered hereinafter with respect to more detailed operating parameters and explanation to enable those of skill in the art to more fully understand the invention.

The present invention is applicable to esters formed by the direct reaction of a dihydric alcohol and a dicarboxylic acid. Suitable glycols are those containing 2 to about 10 carbon atoms, preferably 2 to 4 carbon atoms, and as examples thereof there may be mentioned ethylene glycol, propylene glycols such as 1, 3 propane diol, butylene glycols such as 1,4-butane diol, neopentyl glycol, cycloalkylene-containing compounds such as trans-bis-1,4-(hydroxymethyl) cyclohexane and aromatic compounds such as 1,4-bis-(2-hydroxyethoxy) benzene. Thus, the diol will contain a suitable organic moiety between hydroxyl groups and most often will be characterized by methylene radicals attached to hydroxyl oxygen atoms. Additional examples of suitable glycols will be obvious to those of skill in the art, the term being employed to include diols capable of supplying the alcoholic moiety of esters formable into fiber-forming polymers. The terms "diol", "dihydric alcohol", "glycol" and the like are used interchangeably herein to designate such compounds.

The dicarboxylic portion of the ester is a divalent radical which may be aliphatic, aromatic, or a combination thereof. Suitable dicarboxylic acids are terephthalic acid, azelaic acid, isophthalic acid, dibenzoic acid, the various hydrogenated phthalic acids and the naphthalene dicarboxylic acids, e.g., 1,5-and 2,6-naphthalene dicarboxylic acids, 4.4-dicarboxydiphenoxyethane, hydroxycarboxylic acids of pivalolactone and the like. Of course, copolyesters wherein a mixture of 2 or more dicarboxylic acids and/or 2 or more diols and/or 1 or more dihydroxydicarboxylic acids are employed are within the scope of the present invention. Of particular note, are polytetramethylene terephthalate and copolyesters formed from varying amounts of adipic and terephthalic acids in combination with ethylene glycol, i.e. a copolyester containing at least 75 percent terephthalate units. The most preferred polyester, polyethylene terephthalate, is used to exemplify the invention..

On a theoretical basis, with the formation of monomeric half ester (mono-hydroxyethylterephthalate) and subsequent polycondensation with maximum evolution of water according to the reaction mechanism as follows:

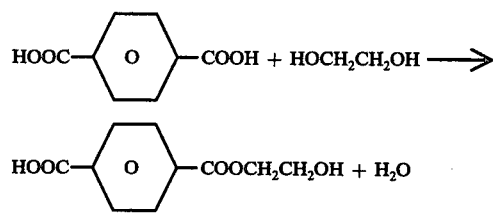

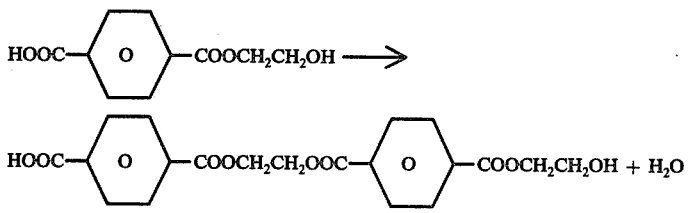

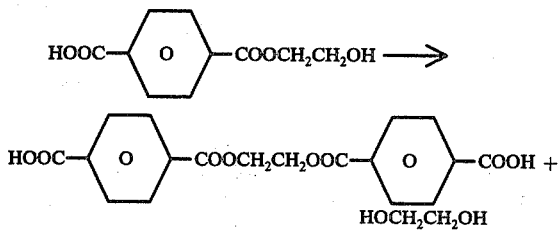

the mole ratio of diol/diacid should ideally be 1/1. However, as in nearly all reaction mechanism, the reaction does not proceed to 100 percent completion at equilibrium nor does it proceed in exact conformity with the theoretical mechanisms, i.e. a mixture of half ester and bis(hydroxyethyl)terephthalate, or diesterified acid, is initially formed for further condensation into a variety of dimer and higher oligomer compounds with evolution of glycol as well as water. For example, the second reaction mechanism, supra, could be modified as follows:

In general, since every portion of diacid is not in a monoesterified condition prior to polycondensation and polycondensation does not proceed according to the most efficient use of glycol, it has been found that an excess quantity of diol over the stoichiometric quantity is required. A diol/diacid ratio in the range of about 1.01:1 to 2.5:1, respectively, is desirable. Certainly, a greater excess of glycol would be operable, but would be uneconomical. With the employment of the self-compensating primary esterification unit, coupled with the fact that esterification and low molecular weight oligomer formation proceed nearly simultaneously, a relatively low molar ratio of diol/diacid of the order of 1.2:1 to 1.8:1, respectively is preferred.

Thus, it is seen that the product of esterification is not a true monomer but is more precisely a mixture of true monomer, as defined as one polymer repeat unit (either mono- or bis- (hydroxyethyl) terephthalate could be considered as monomer in the formation of polyethylene terephthalate), admixed with low molecular weight carboxyl and/or hydroxy-terminated polyester oligomer or prepolymer as well as unreacted diacid, unreacted glycol and undesired side products, particularly diethylene glycol. The term 'oligomer mixture' is employed henceforth to describe the product of esterification, it being understood that the terms 'monomer', 'prepolymer' and the like, where used to characterize the product of primary or secondary esterification have been employed interchangeably with 'oligomer mixture'.

The terephthalic acid and ethylene glycol could be fed separately into the first esterifier; however, an economic benefit is realized by the employment of a single feed line carrying terephthalic acid and ethylene glycol thereto. The duplication of feed system and pressure regulation problems with separate glycol and acid feed lines are eliminated with the employment of a single reactant feed system. Numerous mixing devices may be employed, it having been found that a longitudinally oriented, screw-type mixer of the continuous cavity, non-mated coextensible screw type functions efficaciously. Using the molar ratios hereinbefore detailed extremely viscous pastes of the order of about 600 to 2000 poises and above are formed to be pumped under pressure into the esterification system. Thus, sufficient fluidity must be maintained throughout the feed system without requiring excessive quantities of glycol (a less viscous paste believed to have a better "wetting" effect on particulate terephthalic acid which would facilitate subsequent solvation and inter-action at elevated temperatures).

In one of the preferred embodiments of the invention, a pumpable paste is prepared from terephthalic acid/ethylene glycol in the molar ratio of about 1.4:1 to 1.8:1, respectively, preferably about 1.6:1, respectively, to be pumped under an applied pressure below 30° centigrade, preferably at 20° centigrade, without the addition of a viscosity regulant by employing terephthalic acid within a specific particle size range and distribution. It has been found that terephthalic acid particle size, within the diol/diacid molar ratios employed, can have a pronounced effect on paste pumpability and, hence, overall productivity of the integrated, continuous process. Where terephthalic acid particle size is too small, e.g. a normal distribution peaking below about 12 microns, the paste develops viscosities limiting its efficient transfer and exhibits poor homogeneity. Conversely, where the terephthalic acid particles are of a normal distribution peaking at about 75 to 100 microns or above, the paramount problem is poor solubility in the oligomer mixture leading to the possibility of unreacted diacid being transferred to subsequent reaction steps.

It has been found that a pumpable paste of terephthalic acid/ethylene glycol within the stated molar ratios may be prepared employing terephthalic acid having a normal distribution within a defined particle size range. Alternatively, a bi-modal distribution peaking at relatively small and large particle sizes may be utilized.

Particulate terephthalic acid having an essentially normal distribution within the range of about 15 to 50 microns, preferably about 15 to 25 microns and most preferably about 16 to 20 microns, can be admixed with ethylene glycol into a homogeneous, pumpable paste which rapidly dissolves under esterification conditions in the oligomer mixture. With such material of normal distribution (a single peak), it is preferred that particles of a size over about 100 to 150 microns be removed by, for example, a suitable screen, prior to introduction thereof into a mixer. By a normal distribution as used herein is meant either a single peak at the stated value with 50 percent of the particles having a size ±5 microns of such stated value or a flat-topped peak at the stated value with about 50 percent of particles having a particle size less than about twice the stated value.

A blend of relatively small and large particle size terephthalic acid within defined proportions may also be employed in the continuous process. It has been found that a bi-modal distribution of terephthalic acid wherein the major peak is at about 7 to 15 microns, preferably about 10 to 12 microns, and the minor peak is at about 80 to 120 microns, preferably about 100 to 110 microns, with essentially no particles above about 400 microns, also functions satisfactorily. The bi-modal particle size distribution should give a major peak content of about 25 to 55 percent, preferably about 50 to 55 percent, and a minor peak content of less than about 15 percent, preferably about 11 to 13 percent.

The preferred particulate terephthalic acid, in addition to conforming to the desired particle size range and distribution pattern, should be at least 90 percent pure terephthalic acid, preferably at least 99 percent by weight terephthalic acid. Additionally, the terephthalic acid should contain less than 50 parts per million (ppm) 4-carboxybenzaldehyde, preferably less than 25 parts per million 4-carboxybenzaldehyde, less than 10 parts per million heavy metals, preferably less than 3 parts per million heavy metals, and have an acid number (milligrams potassium hydroxide/gram acid) of 675 ± 2. The preferred bulk density of the terephthalic aicd is at least about 45 pounds/cubic foot.

Alternatively, to form and mantain a pumpable paste, a viscosity regulant can be added through the glycol line. The additive should be selected from compositions having a higher fluidity than glycol under ambient conditions so that a minimum quantity need be used. The acid and glycol are both highly reactive materials and for this reason most common organic viscosity regulators are inapplicable, causing side reactions, complex formation and the like. The wisest course to follow is to select a material inherently present during the reaction sequence. Hence, monomer could be recycled but this is uneconomical since productivity is reduced. It has been determined that water, a product of polycondensation, can be employed as a viscosity regulator, having a greater liquidizing effect on the paste than an equivalent volume of glycol. Moreover, an additional disadvantage where glycol quantity would be increased is intercondensation of excess glycol units into ethers which later become part of polymeric chains and thereby lower product uniformity and softening point. The water has a secondary benefit in suppressing diglycol ether formation. Water in amounts ranging from about 0.05 to 15 percent by weight based on weight of glycol, and preferably about 1 to 10 weight percent, may be employed without deleteriously affecting product properties. However, certain process disadvantages are developed with water which must be overcome before the system is completely operable. These are steam generation within the feed pipe as the water approaches the inlet to the esterifier which causes agglomeration of terephthalic acid with consequential clogging of the feed line, and requirements of increased residence time for removal of the additional water throughout the system. Cooling of the feed line is difficult to achieve on a practical basis in plant operations of commercial size while prolonged residence heightens chance of polymer degradation.

Another alternative method to lower paste viscosity would appear to be to increase the temperature of the paste, it being generally accepted by those of skill in the art that elevation of temperature has an inverse effect on viscosity. However, with the terephthalic acid-glycol paste, temperatures significantly above room temperature, i.e. above about 50° centigrade, appear to disrupt the homogeneity of the paste system. The degree of mixing to form a pumpable paste is not achieved within existing conventional mixers. Large clumps of settled terephthalic acid alternate in plug flow fashion with fluid glycol, interfering with the contemplated continuous process.

The paste is forced into the primary esterifier under an applied pressure higher than that employed in the reaction vessel. Otherwise, there would be the possibility of reverse flow from an area of higher pressure to one of lower relative pressure. Pressure and temperature are regulated in the primary esterifier so that water is evolved while glycol loss is minimized. Therefore, at the temperature employed, the optimum pressure will be slightly in excess, e.g., 5 to 10 p.s.i.g. in excess, of the partial pressure (pressure developed by the average quantity of glycol within the system) of glycol in the system. Although an inert gas may be used for pressure regulation, it is preferred that water vapor removal be adjusted so that the autogenic pressure of steam formed at reaction temperatures maintains the desired pressure. Temperature should be within the range of about 197°–300° centigrade, preferably about 225° to 275° centigrade and most preferably about 250° centigrade. Higher temperatures are operative but the corresponding pressure requirements would hinder rapid removal of water. With the above temperatures, pressure should be within the range of about 5 to 600 p.s.i.g., preferably about 20 to 80 p.s.i.g. and most preferably about 40 p.s.i.g. Pressure, of course, may be below atmospheric, i.e. 0–15 p.s.i.a., but would require a vacuum in the secondary esterifier where employed. When the multicompartment type of reactor as shown in the drawing is employed, it may be necessary to insert vapor tubes running from above liquid level to below each series of baffles.

As stated, esterification and polycondensation or polymerization proceed simultaneously during initial stages of reaction under superatmospheric pressure and elevated temperatures. Where two stage esterification is employed using the most preferred operating parameters as hereinbefore disclosed, it has been found that an effluent is produced having a composition convertible through second stage esterification and polycondensation into polyester of intrinsic viscosities of 0.9 and higher at increased throughputs of up to about 25%.

It has been found that the oligomer mixture product of primary esterification is characterized by a percent esterification, based on percent of initial carboxylic groups that have been reacted, ranging from about 50 to 95 percent, preferably about 75 to 95 percent, and most preferably, about 85 to 95 percent. More particularly, the effluent contains an oligomer mixture having up to about 5 repeating units and an average chain length of about 2.5 repeating units based on terephthalic acid, less than about 1.60 weight percent diethylene glycol, less than about 0.5 weight percent water and less than about 2.0 weight percent free glycol. Considering the oligomer mixture per se in greater detail, it has been found that employing optimum operating parameters and precursor paste as described herein, the oligomer mixture will contain, based on weight percent of total effluent, about 20 percent bis-(hydroxyethyl) terephthalate, about 20 percent trimer, about 25 percent dimer and lesser amounts of half ester, tetramer and above tetramer repeat unit material, i.e. about 10 or less percent mono-hydroxyethyl-terephthalate, about 15 percent tetramer and less than about 10 percent over tetramer material.

As stated hereinbefore, for maximum molecular weight development, it is highly desirable that no unesterified terephthalic acid be fed to the vacuum polymerization stages. To this end, an agitated, semi-compartmental, primary esterifier had been described and recommended. Unexpectedly, it has been found that the utilization of this type of reactor, as well as other designs which will be obvious to those of skill in the art, wherein a high degree of back-mix occurs, lowers the diethylene glycol content of the oligomer mixture, a surprising advantage of the novel process.

It has been found that diethylene glycol content, which has a deleterious effect on polymer properties, can be minimized utilizing optimum conditions of esterification in the primary and secondary esterifiers, that is, insuring as near a complete esterification as possible in the primary esterifier, while maintaining the reaction mass in the primary esterifier in a highly agitated state, i.e. as measured by a Reynolds number greater than about 50,000. In a preferred aspect the mixture in the primary esterifier is subjected to a degree of agitation sufficient to maintain the composition thereof as near as possible to that of the effluent being transferred to the secondary esterifier, i.e. a Reynolds number of about 600,000 in the semi-compartmental vessel as described. Unexpectedly, there is no decrease in the rate of esterification at high back-mix conditions.

It has been found that under conditions of vigorous agitation, a lower number of carboxyl end groups is found in the composition as well as in the effluent of the primary esterifier. It is believed that this condition of low carboxyl end group concentration accounts for the decrease in diethylene glycol content. Expressed differently, it is believed that the rate of diethylene glycol formation is substantially higher when the primary esterifier composition is high in carboxyl end groups because of a catalytic effect, directly proportional to concentration, of carboxyl end groups on diethylene glycol formation. Hence, extreme agitation lowers carboxyl end group concentration and, as a result, suppresses ether formation.

To illustrate this aspect of the present invention, a feed composition consisting of 62.5 percent (w/w) tetephthalic acid, 37.5 percent (w/w) ethylene glycol and 200 ppm sodium hydroxide buffering agent is fed into two esterification systems equipped with primary and secondary esterifiers. Both of the primary esterifiers are maintained at about 240° centigrade under 50 p.s.i.g. Both of the secondary esterifiers are maintained at about 240° centigrade at atmospheric pressure. Table I is a tabulation of the carboxyl end group and diethylene glycol contents of products from both primary and secondary esterifiers. Residence times are varied as indicated to result in effluents of different carboxyl end group concentration.

TABLE I

| Case | | Carboxyl End Groups Gram Equivalents/ $10^6$ grams | Diethylene Glycol (Mole %) | Residence Time (Hours) |
|---|---|---|---|---|
| I | Primary esterifier | 540 | 1.4 | 3.5 |
| | Secondary esterifier | 201 | 1.6 | 1.2 |
| II | Primary esterifier | 1640 | 2.6 | 2.5 |
| | Secondary esterifier | 845 | 3.7 | 1.0 |

With the relationship between carboxyl end groups and diethylene glycol concentration established, it is found that by reducing the carboxyl end group concentration of the composition in the primary esterifier by means of high back mixing coupled with maximum, i.e. 90–95% esterification therein enables the production of effluent of lowest relative diethylene glycol content.

As the data clearly shows the rate of di-ethylene glycol formation is substantially higher when the primary esterifier composition is high in carboxyl end groups (Case II). In a plug flow reactor the average carboxyl end group content would be 5,000–6,000 gram-equivalents/$10^6$grams.

As discussed hereinbefore, the most preferred temperature and pressure conditions in the primary esterifier are 250° centigrade and 40 p.s.i.g. respectively with the reactor operating in conjunction with a water reflux under pressure to wash evolved glycol back into the system. It has been found that under these operating conditions, or more precisely, where the pressure in the primary esterifier is up to about 15 to 25 p.s.i.g. below the pressure of pure glycol at the reaction temperature but still above the partial pressure of glycol in the vessel, an advantage in rate of polymer production is realized. However, a reflux system, i.e. scrubbing column or the like, is required for adequate control of glycol inventory under the reduced pressure. Preferably, the pressure employed is less than 10 p.s.i.g. below the vapor pressure of pure glycol and, most preferably, is about 5 p.s.i.g. below such pressure. To illustrate the benefits resulting therefrom, in the novel, integrated process with two stage esterification as described, the rate of paste fed into the primary esterifier can be increased without affecting degree of esterification or final product properties to enable an increase in productivity of up to about 25 percent e.g. from about 1600 to about 2,000 pounds per hour.

Although a degree of esterification of as low as about 50 percent still allows the production of very high molecular weight polyester, in order to minimize ether formation and consistently reach intrinsic viscosities of 0.9 and above, esterification should proceed to as near 100 percent as practical. It has been determined that in the absence of unduly prolonged residence times with the accompanied inventory, degradation and rate of throughput problems, that at least a second stage esterification at a pressure below that in the primary esterifier should be employed. Pressure is below that in the first esterifier but sufficient to insure about a glycol/diacid mole ratio of 1/1. In general, pressure may range up to about 600 p.s.i.g., but preferably is below 80 p.s.i.g., and most preferably is atmospheric pressure. Of course, where pressures near or at atmospheric pressure are employed in the primary esterifier, the second vessel should be maintained under a slight vacuum. Temperature will be within the range stated for primary esterification, preferably about 5° to 10° below such temperature, e.g. 245° centigrade at atmospheric pressure. Again, it has been found that the reaction parameters, particularly the most preferred temperature and pressure, coupled with a suitable residence time, enable the terephthalic acid to reach an esterification of over 95 percent, typically about 98 percent, to form a monomer or, more precisely low molecular weight oligomer, which can undergo subsequent polymerization at increasing temperatures and vacuums to produce the desired product. While a two step esterification has been described, it should be realized, of course, that a gradual, continuously declining, pressure process is applicable.

In addition to attaining for practical purposes 100 percent esterification of carboxylic groups in the secondary esterifier, the effluent from the secondary esterifier is characterized by an absence of free terephthalic acid, relatively low percentages of di-ethylene glycol and water, e.g. typically about 0.01 to 0.5 percent water and 0.1 to 5 percent di-ethylene glycol, and a monomer for subsequent polycondensation having an average chain length of nearly 3 terephthalate units, and ranging up to about 10 units. This intermediate, an essentially transparent, water and solid-free liquid, is then fed into the polymerization stage of the process.

Utilizing preferred reaction parameters the effluent from the second esterifier, as weight percent of effluent comprises less than about 2.0 percent, preferably less than about 1.75 percent, diethylene glycol; less than about 0.2 percent, preferably less than about 0.1 percent, of free water and less than about 0.5 percent free glycol, the balance of the effluent consisting essentially of an oligomer mixture. Considering this second oligomer mixture in greater detail, again based on weight percent of effluent, the average chain length has increased to approximately 2.75 repeat units with a pronounced increase in trimer and above material and corresponding decrease in dimer and below oligomer. More particularly, this oligomer mixture contains about less than 5 percent half ester, about 20 percent bis-(hydroxyethyl) terephthalate, about 20 percent dimer, about 25 percent trimer, about 25 percent tetramer, and about 10 and above percent higher molecular weight material.

Multistage esterification is of additional benefit since there is produced a more gradual reduction in pressure between esterification and polymerization process phases, this being especially important from an engineering viewpoint because of the control thereby achieved in the initial stages of further condensation and/or polymerization.

Polymerization continues in the multi-sectional, "low" polymerizer having a design as described. It has been determined that a three step reaction within defined temperature and pressure ranges produces an effluent having optimum characteristics, particularly degree of polymerization, suitable for introduction into a single vessel "high" polymerizer or finisher for formation of polymer having an intrinsic viscosity of 0.9 or above. Vacuum and temperature are incrementally increased, for example, as follows in the first polymerizer:

| | *Pressure | Temperature ° C |
|---|---|---|
| 1st Stage | 60–140, preferably 60–80 | 250–265, preferably 255 |
| 2nd Stage | 30–60, preferably 35–45 | 260–275, preferably 265 |

-continued

| | *Pressure | Temperature ° C |
|---|---|---|
| 3rd Stage | 5–30, preferably 10–25 | 270–285, preferably 275 |

*millimeters Hg pressure, absolute

If final product intrinsic viscosity is not critical, the first polymerizer could consist of only 2 sub-steps wherein the second step would operate at a pressure similar to that indicated above in the final or third step.

Under the conditions of reduced pressure and high temperature present in the first polymerizer, vigorous ebullition causing splashing and, consequently, large surface formation for evaporation as well as further condensation and turbulence for speed of reaction occurs. Additional agitation occurs as a result of the vapors being forced through the entire depth of liquid in order to escape. In the absence of a multi-step arrangement, low molecular weight oligomers in significant quantities would be lost due to the entrainment effect of evolved glycol. The scrubbing action produced as the vapors pass through each subsequent volume of liquid virtually eliminates oligomer loss.

With the employment of the preferred three step cycle, the intermediate polymeric product is characterized by a glycol/terephthalic acid molar ratio of about 1.02/1 to 1.05/1, respectively, an intrinsic viscosity of about 0.1 to 0.5, preferably 0.2 to 0.25, a degree of polymerization of about 10 to 75, preferably 25 to 35 units on the average, about 20 to 90, typically 30 to 40, milliequivalents/kilogram free carboxylic acid groups, and a diethylene glycol content of about 2 to 2.5 mole percent.

If one particular aspect of the process could be singled out as the most critical for the attainment of the high intrinsic viscosity product, it would possibly be the carrying out of the final step of polymerization in a single vessel so as to go from a polymer having an average intrinsic viscosity of about 0.25 up to one having an average intrinsic viscosity of 1.0 to 1.5 or higher. In large part this is possible because of the recognition of certain inherent benefits present in a direct esterification process. The molecular chain is able to significantly increase beyond that contemplated with ester-interchange monomer. In fact, comparative runs under essentially the same process conditions with ester-interchange monomer of highest available purity have demonstrated that the maximum product intrinisic viscosity obtainable is usually about 0.9, below that obtainable by means of the novel process as described herein. This intrinsic viscosity difference is particularly critical where the objective is to produce high tenacity continuous filaments for use as tire yarn, v-belt reinforcement, rope yarn, and like end uses.

The essentially horizontally-aligned, high polymerizer has been described in general terms hereinbefore. As stated, mesh and spacing of the foraminous members increase from inlet to outlet. The critcal features involved in the design of a suitable high polymerizer of this general type are, in addition to the number of screens, the percent void space available across the face of each such member and the spacing between such members, the latter being arranged to eliminate bridging. As polymer viscosity increases, screens and the like of a higher percent void area are required to lift thin films of polymer into the vapor space without impeding polymer flow. Power input should be maintained relatively low, since the final stages of polymerization are carried out at a temperature approaching the degradation point of the polymer. It has been determined that that total void area of the surface generating devices, assuming a uniform distribution over the faces thereof, should be about 40 percent at the inlet and increase through the high polymerizer up to about 70-90 percent void space at the discharge end of the vessel. The terms "surface generating device" and "foraminous member" are used in a generic sense to describe thin circular plates of diameter slightly less than the internal diameter of the reactor having the disclosed +perforated" or void space across their faces. These plates may take the form of screens, perforated discs, spoked wheels and the like as well as combinations thereof. The surface generating members may be eccentrically mounted and constructed with a minimal clearance, i.e. about ⅛ inch, between the edges thereof and the internal surface of the reactor to exert a polymer scraping or wiping action to avoid polymer build-up within the reactor. Alternatively, wiping appendages may be attached to the rotating screens to accomplish the same purpose.

Although control and capacity can be achieved to a great degree by inclusion of a maximum of surface generating members having sufficient open space to allow polymer flow coupled with sufficient spacing thereinbetween to prevent bridging, an end product of variable properties, particularly with respect to molecular weight distribution, can result because of non-uniform treatment of polymer during high polymerization. An agitator design following the general teachings known to those skilled in the art may not insure uniform treatment of polymer.

Excessive by-passing of polymer through the high polymerizer, that is polymer which has not been exposed to the desired residence time or degree of surface area generation thereof through the vapor space, results in production of polymer of variable properties. It has now been found that passage of polymer through a high polymerizer of the general type as described having a baffling factor (B) of at least 3,500, preferably above 4,000, eliminates excessive by-passing of polymer and insures uniformity of product, other control factors being cnstant.

The baffling factor at a particular point in the high polymerizer can be calculated, and therefore regulated, by the following equation:

$$(NPv)/A = B$$

wherein $B$ is baffling factor, $N$ is number of surface area generators from the point of calculation in the high polymerizer to the discharge end of the reactor, $Pv$ is polymer viscosity in poises at the point of calculation in the high polymerizer and $A$ is the average cross-sectional void area of the surface generator expressed in square feet at standstill beneath the polymer pool level.

Assuming a predetermined viscosity gradient, it is seen that the baffling factor at a particular surface generating member can be increased to the desired value by increasing the number of surface generating members subsequent thereto or decreasing cross-sectional void area of that particular foram nous member. As an example, assuming a high polymerizer as described carrying 32 surface generating members, at a point in the reactor corresponding to member 17 with a melt viscosity at said point at reaction temperature of about 1,000 poises, A should preferably be 4 or less, the minimum value being determined largely by rate of polymer flow desired. The value of A, and hence B, can be conveniently changed through design of the surface generating members and/or adjustment of clearance between said members and the inner surface of the vessel.

A short helix or spiral feeder is described as carried by the rotating shaft of the high polymerizer at its discharge end. The helix, in addition to its forwarding action, assures the production of a uniform product through homogenization of the product, eliminating minor fluctuations in polymer properties, particularly intrinsic viscosity, which could otherwise occur during the continuous process.

Temperature in the high polymerizer will be in the range of about 270°–310° centigrade, preferably 285°–305° centigrade with a vacuum of about 0.1 to 10 mm/Hg., preferably 0.5–3 mm/Hg.

The final polymer as discharged from the high polymerizer is characterized by a melt viscosity of about 2,000 to 100,000, preferably above 20,000, an intrinsic viscosity of about 0.4 to 1.5, preferably above 0.95, a degree of polymerization of about 50 to 200, preferably above 185, carboxyl end content of about 20 to 55 milliequivalents/kilogram, preferably less than 30 milliequivalents/kilogram; about 2 to 4 mole percent diethylene glycol, preferably less than 2.25 percent and a melting point between about 250° to 259° centigrade, preferably above 258° centigrade. With employment of optimum processing conditions, the preferred characterization is readily attained.

The continuous feeding of polymer to a spinning manifold directly from the polymerization process requires the employment of a positive feed system: At this point, it is essential that the temperature of the polymer be held to about 300° centigrade or below to prevent undue polymer degradation.

A gravity fed screw extractor, as illustrated in the drawing, will most often be employed to convey adequate quantities of polymer to the spinning manifold. In general, conventional screw extractors which have not been engineered to minimize possible temperature increase of the viscous polymer during conveyance to the spinning manifold are not entirely suitable in continuous fiber-forming operations. To assure adequate temperature control, the screw extractor of Yates, described in commonly-assigned now abandoned application Ser. No. 802,259, filed Feb. 26, 1969, employing minimal overfeed, i.e. 15 to 30 percent based on screw capacity, is recommended.

Further difficulties are present during transfer of the polymer from the screw extractor to the spinning manifold. Where a conventional single discharge outlet from the screw extractor is employed, a temperature gradient is found across the cross-sectional area of flowing polymer. Division of the single discharge into a plurality, usually two, manifold feed conduits, results in a polymer of different temperature being fed into different segments of the spinning manifold necessitating variance of spinning conditions although the precursor polymer is from a common supply. It has been found that the employment of dual, approximately symmetrically-positioned, outlets from the screw extractor leading into the spinning manifold significantly reduces polymer temperature variance through the manifold, enabling the use of identical spinning conditions in all spinning lines emerging from the common manifold where desired.

As a more specific example of the process, particulate terephthalic acid having a normal distribution of particle size at 25 microns with at least 50 percent of diacid particles being below about 50 microns is passed through a 100 micron particle size screen and subsequently continuously admixed with ethylene glycol in the molar ratio of glycol/acid of 1.6/1 to form a pumpable paste having a viscosity of about 1600 poises. The paste is continuously pumped at the rate of 2200 pounds per hour along with about 200 parts per million sodium hydroxide buffering agent under a pressure of 100 p.s.i.g. to a first stage esterifier as depicted in the drawing having a 6000 pound inventory and operating at 250° centigrade under an autogenic pressure of 40 p.s.i.g. The vaporous effluent is subjected to reflux as described to wash evolved glycol back into the reaction vessel. Liquid product, described in Table II, is extracted to allow an average residence time of about 3 hours and transferred into the secondary esterifier, also containing a 6000 pound inventory, operating at 245° centigrade and atmospheric pressure. Following about 2.0 hours residence time in the secondary esterifier, liquid from the secondary esterifier, also described in Table II, is transferred continuously to the three stage low polymerizer as described together with 1100 parts per million antimony trioxide polymerization catalyst. The low polymerizer first stage operates at 250° C and 65 mm Hg, the second at 260° C and the third at 275° C and 20 mm Hg. Depth of liquid, low polymerizer size and diameter of transfer tubes are designed to allow the removal of about 1850 pounds per hour of 0.25 intrinsic viscosity material with an average residence time of one hour distributed evenly between the three stages. In a single stage high polymerizer of the recommended design, that is, a horizontally-aligned cylinder with an axially-aligned rotational shaft operating at three revolutions per minute and carrying a plurality of surface generating mambers and a terminal spiral, the number of surface generating members, as well as design and positioning thereof being suitable for desired capacity and control, final polymerization is achieved. Of critical importance, the high polymerizer is designed to have a baffling factor (B) of about 4000. The spiral is of sufficient length to accomplish its homogenization function. The high polymerizer operates at 298° C and 1.1 mm Hg. vacuum and is of size so that the 6000 pounds inventory fills about 1/5 of the volume of the internal cavity. Polymer of the rate of about 1800 pounds per hour of polyethylene terephthalate of 0.95 intrinsic viscosity is continuously produced and discharged into the screw extractor of Yates.

Polymer exiting from the high polymerizer is extruded through a continuous filament die in conventional manner and is drawn down in conventional manner into a high tenacity filament having a tensile factor, $T(E)^{\frac{1}{2}}$, of greater than 30 grams per denier. In the tensile factor equation, 'T', or tenacity is within the range of about 8 to 12 grams per denier or higher while 'E' or elongation is within the range of about 11 to 15 percent or higher.

TABLE II

|  | Product of Primary Esterification | Product of Secondary Esterification |
|---|---|---|
| Carboxyl End Groups (gew/10⁶ gms*) | 478 | 185 |
| Degree of Esterification (%) | 93.7 | 97.6 |
| Free Glycol (wt. %**) | 1.82 | 0.34 |
| Free Water (wt. %) | 0.35 | 0.05 |
| Free TA (wt. %) | 0 | 0 |
| DEG*** (wt. %) | 1.57 | 1.65 |
| MHET**** (½ Ester) (wt. %) | 10.0 | 3.9 |
| Monomer (BHET)***** (wt. %) | 18.9 | 19.3 |

TABLE II-continued

|  | Product of Primary Esterification | Product of Secondary Esterification |
|---|---|---|
| Dimer (wt. %) | 24.7 | 22.0 |
| Trimer (wt. %) | 20.0 | 24.6 |
| Tetramer (wt. %) | 15.6 | 18.1 |
| Over Tetramer (wt. %) | 7.1 | 10.3 |

*grams equivalent/10⁶ grams
**weight percent based on total product
***diethylene glycol,
****mono-hydroxyethylene terephthalate
*****bis(hydroxyethyl) terephthalate As used herein, intrinsic viscosity is a measure of the degree of polymerization of the polyester and may be defined as:

$$\text{Limit } \frac{(\eta - \eta_o)}{\eta_o C} \text{ as } C \text{ approaches } 0$$

where $\eta$ is the viscosity of a dilute solution of the polyester in orthodilorophenol solvent. $\eta_o$ is the viscosity of the pure solvent measured in the same units at the same temperature, and $C$ is the concentration in grams of polyester per 100 milliliters of solvent.

Numerous modifications may be made within the scope of the invention which will appear obvious to those skilled in the art. For example other buffering agents such as lithium hydroxide are fully operable within the scope of the invention. Likewise, suitable polymerization catalysts are those routinely employed in polyester polycondensation systems, e.g. compounds of trivalent and pentavalent antimony, germanium dioxide, manganese acetate, and titanium alkoxides. Sequestering agents such as trimethyl phosphite, compounds of phosphorous oxyacids and their esters can be used as needed together with delustrants and nucleants of which titanium dioxide, barium sulphate and talc are examples.

Accordingly, it will be equally obvious to those skilled in the art that such modifications will not depart from the spirit and scope of the invention as defined in the appended claims.

What is claimed is:

1. In a process for developing high molecular weight polyester from a direct esterification polyester prepolymer having an intrinsic viscosity of at least about 0.1 wherein said prepolymer is passed through a polymer finisher of the type comprising a generally cylindrical vessel having an inlet for liquid near one end and an outlet for liquid near the opposite end thereof and an intermediate vent for vapor and, mounted inside along an axis substantially parallel to the cylindrical axis, a multiplicity of foraminous surface generating members adapted to rotate and thereby agitate liquid in the vessel, the cross-sectional void space and spacing in between said members generally increasing from the inlet end in the direction of the outlet end, the improvement which comprises positioning said members so that substantially all of said members exert a baffling factor (B) of above about 3500 on liquid flowing therethrough where $B = (PNv)/A$ wherein $B$ is the baffling factor, $N$ is number of surface area generators from the point of calculation in the high polymerizer to the discharge end of the reactor, $Pv$ is polymer viscosity in poises at the point of calculation in the high polymerizer and $A$ is the average cross-sectional void area of the surface generator at the point of calculation beneath the polymer pool level expressed in square feet at standstill.

2. The process of claim 1 wherein the baffling factor is at least 4000.

3. The process of claim 2 wherein the polyester is polyethylene terephthalate.

4. The process of claim 3 wherein said finisher is opearated at a temperature of about 270°–310° C. and a pressure of about 0.1 to about 10 mm Hg.

5. The process of claim 2 wherein said finisher is operated at a temperature of about 285°–305° C. and a pressure of about 0.5–3 mm Hg.

6. A process for polymerizing a terephthalic acid-/ethylene glycol oligomer mixture which comprises passing said mixture through a multistage first polymerizer wherein vacuum and temperature are increased in each succeeding stage to form a prepolymer of at least about 0.1 intrinsic viscosity and further polymerizing said prepolymer in s polymer finisher of the type comprising a generally cylindrical vessel having an inlet for liquid near one end and an outlet for liquid near the opposite end thereof and an intermediate vent for vapor and, mounted inside along an axis substantially parallel to the cylindrical axis, a multiplicity of formanimous surface generating members adapted to rotate and thereby agitate liquid in the vessel, the cross-sectional void space and spacing in between said members generally increasing from the inlet end in the direction of the outlet end, with substantially all of said members being positioned to exert a baffling factor (B) of above about 3500 on liquid flowing therethrough where $B = (NPv)/A$ wherein $B$ is baffling factor, $N$ is number of surface area generators from the point of calculation in the high polymerizer to the discharge end of the reactor, $Pv$ is polymer viscosity in poises at the point of calculation in the high polymerizer and $A$ is the average cross-sectional void area of the surface generator at the point of calculation beneath the polymer pool expressed in square feet at standstill.

7. The process of claim 6 wherein said first polymerizer is divided into three stages operating at about 250°–265° C. under a pressure of about 60–140 mm Hg, 260°–275° C. and 30–60 mm Hg. and 270°–285° C. and 5–30 mm Hg, respectively, and said finisher is operated at about 270°–310° C. and under a pressure of about 0.1–10 mm Hg with a baffling factor of about 4000.

8. The process of claim 6 wherein said 3 stages are operated at about 255° C. and 50–60 mm Hg pressure, about 265° C.

9. A process for producing fiber-formable polyethylene terephthalate which comprises continuously feeding a pumpable paste of terephthalic acid/ethylene glycol in the molar ratio of glycol/acid of about 1:4 to 1:8, respectively; esterifying said acid with said glycol in a first reaction stage maintained at about 225° to 275° C. under a pressure of about 20 to 80 p.s.i.g. under conditions to reduce free carboxyl group concentration until at least 90 percent of said acid groups are esterified while condensing and returning evolved glycol to said first state; continuously transferring the product of the first reaction stage to a second reaction state; further esterifying said product in said second reaction stage under a pressure from about 20 to 80 p.s.i.g. at a sufficient temperature until at least 95 percent of said acid groups have been esterified; continuously transferring the product of esterification to a polymerization zone; continuously polymerizing said product in a first polymerization stage comprising three sequential reaction stages operating at about 250°–265° C and 60–140 mm Hg pressure, about 260°–275° C and 30–60 mm Hg pressure and about 270°–285° C and 5–30 mm Hg pressure, respectively, to form a polyester prepolymer having an intrinsic viscosity of at least about 0.1; continuously transferring said prepolymer to a finisher operating at about 270°–310° C under 0.1–10 mm Hg pressure; further polymerizing said prepolymer in said finisher comprising a generally cylindrical vessel having an inlet for liquid near one end and an outlet for liquid near the opposite end thereof and an intermediate vent for vapor and, mounted inside along an axis substantially parallel to the cylindrical axis, a multiplicity of foraminous surface generating members adapted to rotate and thereby agitate liquid in the vessel, the cross-sectional void space and spacing in between said members generally increasing from the inlet end in the direction of the outlet end, wherein substantially all of said generating members exert a baffling factor of at least 3,500 on said polymer to form polyethylene terephthalate of at least 0.8 intrinsic viscosity and continuously extracting said polyethylene terephthalate from said finisher.

10. The process of claim 9 wherein said glycol/acid molar ratio is about 1.6; said first esterification stage is maintained at about 250° C under a pressure of about 40 p.s.i.g.; said second esterification stage is maintained under a pressure of about atmospheric pressure; said three sequential reaction zones of said first polymerizer are operated at about 255° C under a pressure of about 60–80 mm Hg, 265° C under a pressure of about 35–45 mm Hg and 275° C under a pressure of about 10–25 mm Hg, respectively, to form a prepolymer of 0.20–0.25 intrinsic viscosity and said finisher is operated at about 285°–305° C under a pressure of about 0.5–3 mm Hg with substantially all of said generating members exerting a baffling factor of at least 4,000 to form a polyethylene terephthalate polymer of at least 0.95 intrinsic viscosity, continuously extracting said polymer from said finishes, continuously feeding said polymer to a spinning manifold and continuously melt spinning polyethylene terephthalate filaments therefrom.

11. The product produced from the process of claim 10.

* * * * *